G. D. BAILY
Fence-Post.
No. 212,784. Patented Mar. 4, 1879.
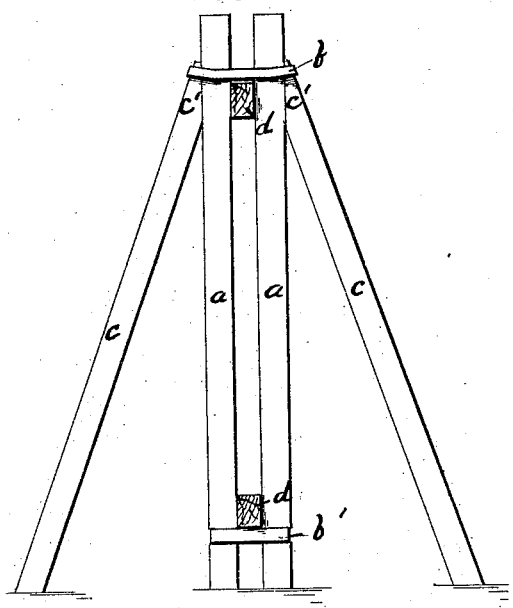
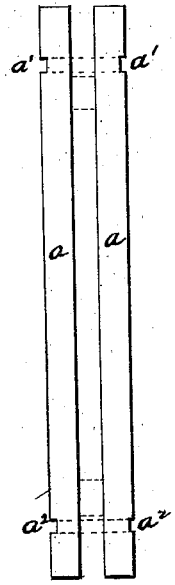
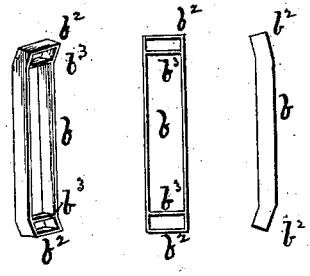
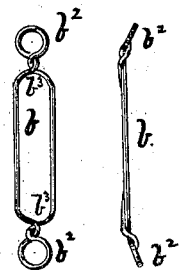
WITNESSES
INVENTOR
George D. Baily
By R. S. & A. P. Lacey ATTORNEYS.

UNITED STATES PATENT OFFICE.

GEORGE D. BAILY, OF SPICELAND, INDIANA, ASSIGNOR OF ONE-HALF HIS RIGHT TO JAMES COCHRAN, OF SAME PLACE.

IMPROVEMENT IN FENCE-POSTS.

Specification forming part of Letters Patent No. 212,784, dated March 4, 1879; application filed September 4, 1878.

*To all whom it may concern:*

Be it known that I, GEORGE D. BAILY, of Spiceland, in the county of Henry and State of Indiana, have invented certain new and useful Improvements in Fence-Posts; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has for its object to furnish a portable fence-post, simple and cheap in structure, free from mortises and tenons, and which may be readily put together or taken to pieces when desired.

It consists in two upright bars, the lower ends of which rest on the ground, and which are held by two clamps or bands placed at or near their ends, the upper of which clamps has loops or eyes on its ends, and which are keyed or fastened within said clamps by two removable wedges, and which are provided with two lateral braces, the upper ends of which are beveled or chamfered and driven into the loops in the upper clamp, and bear on the outer edges of the upright bars above or partially above the said loop, as will be hereinafter explained.

In the drawings, Figure 1 is a side elevation of the complete post, and Figs. 2 and 3 are detail views of parts of the same; and Fig. 4 shows a modified manner of making the upper clamp.

$a\ a$ are the upright bars, which are notched or mortised on their outer edges at $a^1\ a^2$, to let in the ends of the clamps $b\ b^1$ flush with the surface of said edges. The notches may be cut with an ax, and they prevent the clamps from slipping down on the bars. The lower clamp is of ordinary form, adapted to the shape of the bars.

The upper clamp, $b$, has formed on its opposite ends the supplemental loops or eyes $b^2$, which receive and hold the upper ends of the braces $c\ c$, which are beveled or chamfered at $c'$, so that they will slip into or through the loops, and fit snugly against the outer edges of the upright bars $a\ a$ over the ends $b^3$ of the said clamp $b$. The bars $a\ a$ are held within the clamps by the wedges $d\ d$, driven between them, as shown. The upper ends of the braces $c$ extend above, or partially above, the clamp $b$.

When the braces are put in place, as shown in Fig. 1, they are tightened in place by being driven in with the ax. They can be driven so firmly into the loops and against the edges of the bars that when the latter are lifted they will remain in position, as shown.

The braces, when driven into place, as explained, will hold the bars rigidly in an upright position, and prevent any lateral inclination or sagging of the post when the latter is set up.

When a clamp made from round iron, as shown in Fig. 4, is used, the upper ends of the braces $c$ will be so formed that they will pass entirely through the loops, and bring the full face of the chamfer $c'$ against the edge of the post, above the bar or end $b^3$ of the clamp $b$.

This post may be made and put together without tools other than an ax or hatchet, and may be made from sawed or split lumber. It is admirably adapted for use in frontier districts, or where it is inconvenient to procure saws and chisels for cutting tenons and mortises.

When employed for board fence, small cleats are nailed across on the bars $a\ a$, at proper distances, to support the ends of the boards.

The post is designed chiefly for use where the ends of the fence-rails are overlapped in making the panels.

I am aware that a clamp having loops on its ends is not new, and that braces with chamfered upper ends arranged across the sides of the upright bars and held in a clamp or iron band around the post is not new, and I do not claim such devices and arrangement as my invention.

Having described my invention, what I claim, and desire to secure by Letters Patent, is—

The fence-post of structure herein described, consisting of the upright bars $a\ a$, having their lower ends resting on the ground, the clamps $b\ b^1$, the clamp $b$, having the loops or eyes $b^2$ on its opposite ends, the keys or wedges $d$, and the braces $c\ c$, having their upper ends driven into the eyes or loops $b^2$, so that they are held against the outer edges of the bars $a\ a$, with the ends bearing against said bars above, or partially above, said loops or eyes, substantially as set forth.

In testimony that I claim the foregoing as my own I affix my signature in presence of two witnesses.

GEORGE D. BAILY.

Witnesses:
 THEO. E. CHAMNESS,
 J. D. WILLCUT.